Jan. 13, 1959

H. F. MOHR
RADIOTELEPHONE SWITCHING CIRCUIT
WITH RECEIVER SQUELCH CONTROL
Filed June 21, 1955

2,868,964

INVENTOR.
HARRY F. MOHR
BY
J. A. Rechif
ATTORNEY

United States Patent Office 2,868,964

Patented Jan. 13, 1959

2,868,964

RADIOTELEPHONE SWITCHING CIRCUIT WITH RECEIVER SQUELCH CONTROL

Harry F. Mohr, Flushing, N. Y., assignor to Radio Corporation of America, a corporation of Delaware Application June 21, 1955, Serial No. 516,834

3 Claims. (Cl. 250—13)

This invention relates to a keying circuit for two-way radiotelephone equipment, and more particularly to a circuit for silencing a radiotelephone receiver when the associated radiotelephone transmitter is energized.

An object of this invention is to devise a novel, simplified circuit for silencing a radiotelephone receiver when the associated radiotelephone transmitter is energized.

Another object is to provide in a circuit for silencing a radiotelephone receiver when the transmitter is energized, automatic sequencing such that the receiver is silenced before the contacts of the antenna changeover relay transfer the antenna from the receiver circuit to the transmitter circuit, thus preventing sparking at such contacts from causing clicks in the receiver output.

The objects of this invention are obtained, briefly, in the following manner: The coil of a combined transmitter energizing and antenna changeover relay is connected in series with a push-to-talk switch, across the receiver high voltage supply, with the switch connected between the relay coil and negative terminal of the supply. From the common connection of the relay coil and the switch, a connection extends in one embodiment to the anode or collector electrode of an electron discharge device, such as a vacuum tube in the receiver, to thereby remove positive anode potential from this tube when the switch is closed and to silence the receiver by cutting off the flow of current through this tube. In another embodiment, a connection extends from the common connection of the relay coil and the switch to the grid of a tube in the receiver, to thereby bring this grid to zero potential when the switch is closed and to cause this tube to cut off, thus silencing the receiver.

Figure 1:
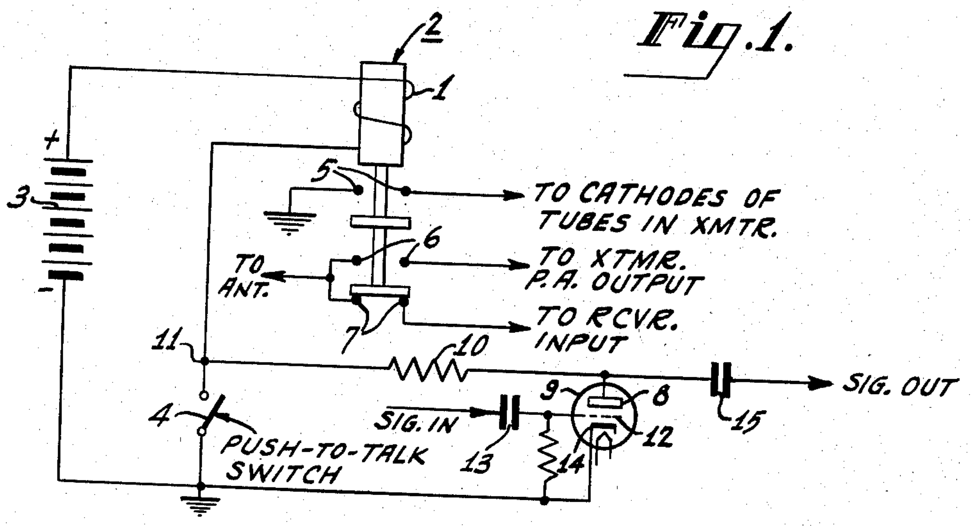
Figure 2:
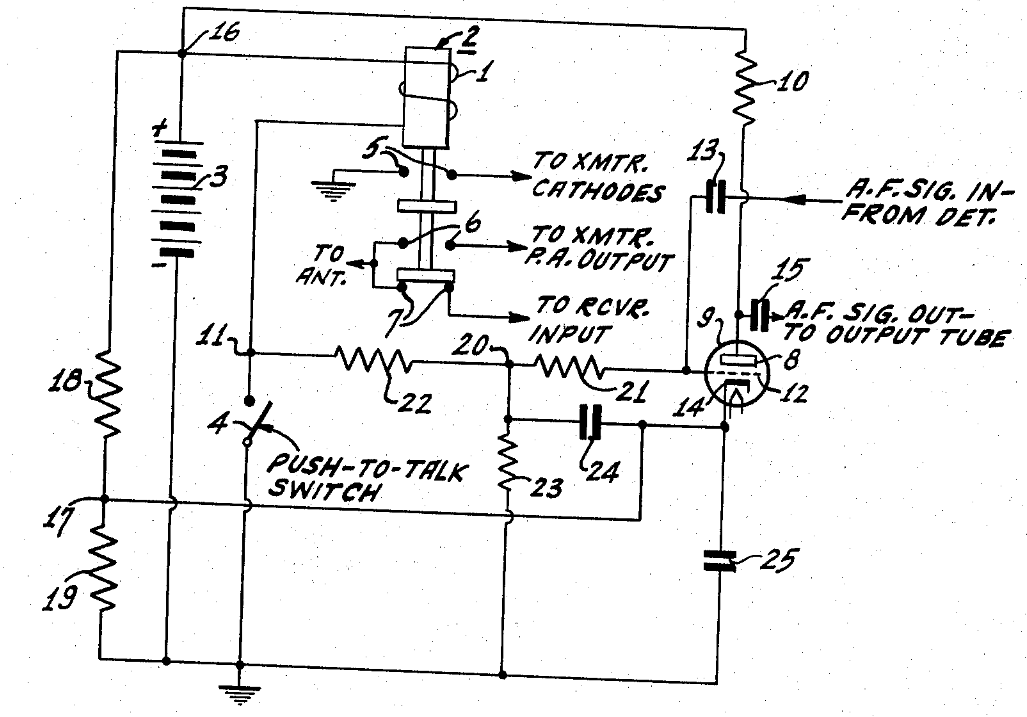

The foregoing and other objects of this invention will be better understood from the following description of some exemplifications thereof, reference being had to the accompanying drawing, wherein Fig. 1 and Fig. 2 are circuit diagrams respectively illustrating two different embodiments of the invention.

Referring first to Fig. 1, one end of the coil 1 of a transmitter energizing and antenna changeover relay 2 is connected to the positive terminal (B+) of the receiver high voltage (anode) supply 3, which is represented by a battery. The other end of coil 1 is connected to one terminal of a single-pole, single-throw push-to-talk switch 4, and the other terminal of switch 4 is connected to the negative terminal (B−) of the power supply 3. If desired, the negative terminal of the power supply may be connected to a point of reference potential which may be zero alternating or radio frequency potential, for example ground. When switch 4 is closed, relay 2 is energized, and when switch 4 is opened, relay 2 is deenergized. Switch 4 is shown as open and relay 2 in its deenergized position.

The transmitter energizing and antenna changeover relay 2 has one pair of normally-open contacts 5 which when closed ground the cathodes of certain tubes in the radiotelephone transmitter (not shown), thus connecting these cathodes to the negative terminal of the transmitter power supply and closing a circuit to enable the energization of such tubes. Thus, when push-to-talk switch 4 is closed, relay 2 is energized to close its contacts 5 and energize the transmitter. Relay 2 also has one pair of normally-open contacts 6 which when closed connect the transmitter power amplifier output to the antenna (not shown), thus changing the antenna over to "transmit" condition. Relay 2 also has one pair of normally-closed contacts 7 (the lowermost pair) which connect the antenna to the input of the radiotelephone receiver (not shown) in the unenergized condition of relay 2 corresponding to the "receive" position of the equipment. When push-to-talk switch 4 is closed, relay 2 is energized to close its contacts 6 and to open its contacts 7, thus changing the antenna over from the "receive" position to the "transmit" position.

The anode 8 of a vacuum tube 9, for example a triode, is connected through an anode load resistor 10 to a point 11, which is the common junction of switch 4 and the lower end of coil 1. Thus, the positive anode voltage for tube 9 is supplied by way of the relay coil 1 from power supply 3, the circuit being completed by connecting the cathode 14 of tube 9 to ground or the negative terminal of power supply 3. Tube 9 is a low-current vacuum tube amplifier in the radiotelephone receiver, and the signal passing through the receiver (originally obtained from the antenna) is supplied through a coupling capacitor 13 to the grid 12 of tube 9. When tube 9 is conducting, the amplified signal is taken off from anode 8 and fed through a coupling capacitor 15 to the following stage of the receiver, from which it finally reaches the loud-speaker. It may be seen that the current drawn by tube 9 flows through relay coil 1, and point 11 is at substantially the full positive potential of power supply 3. However, even when this tube is conducting the current drawn thereby is very low, and is insufficient to cause operation of relay 2, so that its contacts remain in the position illustrated; viz., the unenergized or "receive" position.

When the transmitter keying switch or push-to-talk switch 4 is closed, the positive anode voltage supplied to tube 9 is effectively immediately removed by virtue of the fact that point 11 is then connected to the cathode 14 or ground or the negative side of the power supply 3 through the contacts of switch 4. It should be noted that point 11 is connected to anode 8 by way of resistor 10. The effective removal of the positive anode voltage causes the flow of current through tube 9 to be cut off and the receiver, as a result, is silenced immediately when switch 4 is closed. Tube 9 remains cut off and the receiver remains silenced as long as switch 4 is closed.

The closing of push-to-talk switch 4 also connects the relay coil 1 directly across the receiver high voltage supply 3 and energizes relay 2. The operation of relay 2, when a magnetic field is built up by the flow of current through coil 1 sufficient to operate the armatures engaging its contacts, causes the relay contacts 5 and 6 to close and relay contacts 7 to open. Since a finite time after switch 4 is closed is required to build up the magnetic field to a magnitude sufficient to energize relay 2 and move its armatures, and since tube 9 is cut off immediately when switch 4 is closed and prior to the movement of the armatures of the relay, the receiver is silenced by switch 4 before the contacts 5, 6 and 7 can effectively act to transfer the circuits connected thereto. Therefore, any interference caused by the sparking of the relay contacts at the exact moment the armatures of the relay 2 first engage or disengage the contacts cannot appear in the receiver output.

Although in Fig. 1 the anode voltage for tube 9 is supplied by way of relay coil 1, it is within the scope of this invention to alternatively make tube 9 a screen-grid vacuum tube and to supply the screen grid voltage to this tube by way of coil 1. In this case, similar action would occur, the receiver tube being cut off also when its positive screen grid voltage is removed by closing of switch 4.

Fig. 2 illustrates another embodiment of the invention. In this figure, elements which correspond to those of Fig. 1 are denoted by the same reference numerals.

Now referring to Fig. 2, the anode 8 of tube 9 (which is preferably the first audio amplifier in a receiver and the input of which is supplied by the output of a detector) is connected through load resistor 10 directly to a positive point 16 of the power supply 3. A positive potential of approximately fourteen volts is applied to cathode 14 of tube 9, by connecting this cathode to the common junction point 17 of a pair of series-connected resistors 18 and 19 constituting a voltage divider connected from point 16 to ground or the negative terminal of power supply 3. With zero or ground potential on grid 12, this positive potential on cathode 14 is sufficient to cut off tube 9.

A small positive potential (with respect to ground) sufficient to cause tube 9 to conduct when relay 2 is in the "receive" or unenergized position, is applied to grid 12, by connecting said grid through a resistor 21 to an intermediate point 20 on a voltage divider which is connected across power supply 3 by way of relay coil 1. This voltage divider is constituted by two resistors 22 and 23 connceted in series between point 11 and ground. The current flowing through this voltage divider circuit is not sufficient to cause operation of relay 2. A capacitor 24 is conencted from point 20 to cathode 14, and a capacitor 25 is connected from cathode 14 to ground.

When the transmitter keying switch or push-to-talk switch 4 is closed in Fig. 2, the point 11 (which when switch 4 is open is at substantially the full B+ potential of power supply 3) is connected to ground or the negative side of power suply 3. This means that both ends of the voltage divider network 22—23 are then at ground or zero potential, so that grid 12 immediately goes to B− potential or ground or zero potential. With zero or ground potential on grid 12 (which occurs immediately when switch 4 is closed), the positive potential on cathode 14 causes tube 9 to be cut off immediately. This results in immediate silencing of the receiver, since the cessation of current flow through tube 9 prevents any audio frequency signal supplied to the grid of tube 9 from being transmitted therethrough. Tube 9 will remain cut off, and the receiver will remain silenced, as long as switch 4 is closed to apply zero or ground potential to grid 12.

In Fig. 2, as in Fig. 1, a finite time after switch 4 is closed is required to build up a magnetic field sufficient to operate the relay armatures adapted to engage contacts 5, 6 and 7. Therefore, the receiver is again silenced by switch 4 before the circuits connected to the contacts 5, 6 and 7 can be transferred, and as a result, any interference caused by the sparking of the relay contacts cannot appear in the receiver output.

What is claimed is:

1. In a transceiver, a changeover relay having a winding and having its contacts so constructed, arranged, and connected that when such relay is energized the transmitter portion of the transceiver is enabled and when such relay is deenergized the receiver portion of the transceiver is enabled; a signal amplifier in said receiver portion biased to conduct in response to the application of a positive unidirectional potential to one of its electrodes and to be cut off in response to the removal of said positive potential from said one electrode, a unidirectional power supply having a positive terminal and a negative terminal; a connection extending from said positive terminal through said relay winding to said one electrode, a pair of switch contacts one connected to said negative terminal and the other connected to said one electrode, and means for closing said contacts, thereby to energize said relay and to also remove positive potential from said one electrode by connecting said one electrode through said contacts to said negative terminal.

2. In a transceiver, a changeover relay having a winding and having its contacts so constructed, arranged, and connected that when such relay is energized the transmitter portion of the transceiver is enabled and when such relay is deenergized the receiver portion of the transceiver is enabled; a signal-amplifying tube in said receiver portion biased to conduct in response to the application of a positive unidirectional potential to its anode electrode and to be cut off in response to the removal of said positive potential from said anode electrode, a unidirectional power supply having a positive terminal and a negative terminal; a connection extending from said positive terminal through said relay winding to said anode electrode, a pair of switch contacts one connected to said negative terminal and the other connected to said anode electrode, and means for closing said contacts, thereby to energize said relay and to also remove positive potential from said anode electrode by connecting said anode electrode through said contacts to said negative terminal.

3. In a transceiver, a changeover relay having a winding and having its contacts so constructed, arranged, and connected that when such relay is energized the transmitter portion of the transceiver is enabled and when such relay is deenergized the receiver portion of the transceiver is enabled; a signal-amplifying tube in said receiver portion biased to conduct in response to the application of a positive unidirectional potential to its control electrode and to be cut off in response to the removal of said positive potential from said control electrode, a unidirectional power supply having a positive terminal and a negative terminal; a connection extending from said positive terminal through said relay winding to said control electrode, a pair of switch contacts one connected to said negative terminal and the other connected to said control electrode, and means for closing said contacts, thereby to energize said relay and to also remove positive potential from said control electrode by connecting said control electrode through said contacts to said negative terminal.

References Cited in the file of this patent

UNITED STATES PATENTS

| | | |
|---|---|---|
| 1,940,881 | Ports | Dec. 26, 1933 |
| 2,289,794 | Martin | July 14, 1942 |
| 2,475,578 | Halstead | July 5, 1949 |
| 2,671,166 | O'Brien | Mar. 2, 1954 |